United States Patent [19]

Chapman et al.

[11] 3,910,955

[45] Oct. 7, 1975

[54] BENZOTHIOPHENE-ETHYLAMINES

[75] Inventors: Norman Bellamy Chapman, Hull; Kenneth Clarke, Cottingham, near Hull; Brian Iddon, Tarleton, near Preston; John William James, Langley; Maurice John Hedge, Windsor, all of England

[73] Assignee: Aspro-Nicholas Limited, Slough Bucks, England

[22] Filed: June 18, 1973

[21] Appl. No.: 370,993

Related U.S. Application Data

[63] Continuation-in-part of Ser. No. 100,485, Dec. 21, 1970, abandoned, which is a continuation-in-part of Ser. No. 619,921, March 2, 1967, abandoned.

[52] U.S. Cl. .......... 260/330.5; 260/590; 260/609 R; 424/275
[51] Int. Cl.² ....................... C07D 333/58
[58] Field of Search ................. 260/330.5

[56] References Cited
UNITED STATES PATENTS
3,070,606 12/1962 Anderson........................ 260/330.5
3,518,278 6/1970 Suh.................................. 260/294.8
3,629,267 12/1971 Kaiser et al...................... 260/294.8

FOREIGN PATENTS OR APPLICATIONS
1,174,411 12/1969 United Kingdom............. 260/330.5

*Primary Examiner*—Sherman D. Winters

[57] ABSTRACT

New aminoethylbenzo [b] thiophens of the formula

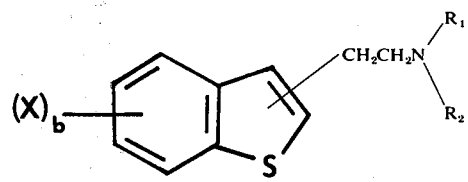

are disclosed and claimed. The compounds have a low toxicity and display anti-5-hydroxytryptamine activity when determined by the method of Woolley, D. W., *Proc. Soc. Exp. Biol. Med.* 98 367 (1958), as well as antibacterial and antiviral activity.

12 Claims, No Drawings

BENZOTHIOPHENE-ETHYLAMINES

This application is a continuation-in-part of Ser. No. 100,485 filed Dec. 27, 1970, which in turn is a continuation of Ser. No. 619,921 Mar. 2, 1967, both now abandoned.

The benzo [b] thiophens of the invention have been found to antagonise the action of serotonin, more commonly called 5-hydroxy-tryptamine and hereinafter referred to as 5HT. 5HT is a naturally occurring amine in the human body and possesses well-defined pharamacological effects. The extent to which these effects perform a normal function is not fully known but in the following conditions 5HT appears to be involved and accordingly the administration of a compound possessing anti-5HT activity should be beneficial in at least one of these conditions.

a. Migraine — Certain highly active anti-5HT compounds, such as methysergide, have been shown to be effective against certain types of migraine and it is reasonable to suppose that in these cases the migraine is due to the vasomotor effect of 5HT.

b. Allergy — The allergic response is mediated by the release of 5HT, histamine and other naturally occurring substances which amongst other properties have the property of constricting smooth muscle. Anti-5HT drugs are therefore of use in the treatment of allergies in general and in particular allergic asthma and skin allergies.

c. Inflammation — 5HT is thought to be involved in the inflammatory response and anti-5HT drugs have, therefore, applications in reducing inflammation.

d. Central nervous system — 5HT occurs widespread in the central nervous system. Whilst its precise role is not known, it is thought to play a part in the functions of the central nervous system. Tranquillising drugs such as reserpine and chlorpromazine possess anti-5HT properties and accordingly anti-5HT drugs have applications as tranquillisers.

e. Cardio-vascular effects — 5HT causes constriction of the peripheral blood vessels in many parts of the body, constricts the vessels of the coronary system and causes a rise in blood pressure. The administration of an anti-5HT drug is therefore indicated where an antihypertensive effect is required.

Some of the compounds of formula I also exhibit an antibacterial activity (especially those in which b is 1 to 4 and X is halogen,) a monoamine oxidase (M.A.O.) inhibiting effect, and are active as mild analgescis, which effects may be additional to or result from the anti-5HT effect Accordingly, the present invention provides a method of antagonising 5HT activity and of combatting bacteria in an animal (including human) body comprising administering a sufficient dose of at least one cmpound of the formula:

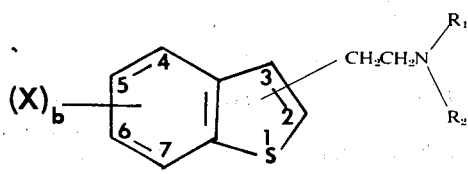

wherein $(X)_b$ represents one or more of the same or different substituents in the benzothienyl nulceus; $b$ is an integer from 0 to 4; X is selected from the group consisting of halogen and alkyl containing from one to six carbon atoms, and $R^1$ and $R^2$ are selected from the group consisting of the same or different hydrogen and alkyl containing from one to six carbon atoms; and acid addition salts thereof.

The benzene ring substituents X may be attached to any position or positions available for substitution in the benzene ring.

Examples of alkyl radicals are methyl, ethyl, n-propyl, n-butyl, n-amyl, n-hexyl, and the various positional isomers thereof such as iso-propyl, iso-butyl, s-butyl, t-butyl, iso-amyl, s-amyl, t-amyl, iso-hexyl, s-hexyl, and t-hexyl.

A particularly preferred group of compounds for use in the present invention have the formula:

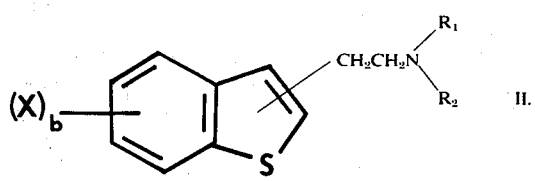

wherein X is halogen, methyl), ethyl, n-propyl, iso-propyl, n-butyl, iso-butyl, s-butyl, or t-butyl, and $R_1$ and $R_2$, which may be the same or different, are hydrogen, methyl, ethyl, n-propyl, isopropyl, n-butyl, iso-butyl, s-butyl or t-butyl. Preferred halogen are chlorine, bromine and iodine.

Salts of the compounds for use in this invention are particularly acid addition salts, such as the pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example, glycollic, maleic, hydroxymaleic, malic, tartaric, citric, salicylic, o-acetyloxybenzoic, nicotinic or isonicotinic acid, or organic sulphonic acids, for example methane sulphonic, ethane sulphonic, 2-hydroxyethane sulphonic, toluene-p-sulphonic or naphthalene-2-sulphonic acid. Apart from pharmaceutically acceptable acid addition salts, other salts are also included within the scope of acid addition salts such as, for example, those with picric and oxalic acid; they may serve as intermediates in the purification of the compounds or in the preparation of other, for example pharmaceutically acceptable, acid addition slats, or are useful for identification, characterization or purification of the bases.

A resulting acid addition salt may be converted into the free compound according to known methods, for example, by treating it with a base, such as with a metal hydroxide or alkoxide, for example, an alkali metal or alkaline earth metal hydroxide, for example, lithium hydroxide, sodium hydroxide, potassium hydroxide or calcium hydroxide; with a metal carbonate or hydrogen carbonate, for example sodium, potassium or calcium carbonate or hydrogen carbonate; with ammonia; or with a hydroxyl ion exchange preparation, or with any other suitable reagent.

A resulting acid addition salt may also be converted into another acid addition salt according to known methods; for example a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

Specific compounds which are useful in the present invention are

N-Methyl-2-(5'-chloro-3'benzo [b]) thienyl) ethylamine;
N-Methyl-2-(5'-bromo-3'-benzo [b] thienyl) ethylamine;
N-Methyl-2-(5-methyl-3'-benzo [b] thienyl) ethylamine;
N,N-Dimethyl-2-(5'-chloro-3'benzo [b] thienyl) ethylamine;
N,N-Dimethyl-2-(5'-bromo-3'benzo [b] thienyl) ethylamine;
N,N-Di-isopropyl-2-(4',5',6',7'-tetrafluoro-3'-benzo [b] thienyl) ethylamine;
N,N-Dimethyl-2-(5'-methyl-3'-benzo [b] thienyl) ethylamine;
N,N-Dimethyl-2-(3'-benzo [b] thienyl) ethylamine;
2-(2'-Aminoethyl)-5-chlorobenzo [b] thiophen;
2-(2'-Aminoethyl)-5-bromobenzo [b] thiophen;
2-(5'-Chloro-3'-benzo [b] thienyl) ethylamine;
2-(3'-Benzo [b] thienyl) ethylamine;
2-(5'-Bromo-3'-benzo [b] thienyl) ethylamine;
2-(5'-Methyl-3'-benzo [b] thienyl) ethylamine;
N- Methyl-2-(3'-benzo [b] thienyl) ethylamine;
N,N-Dimethyl-2-(7'-chloro-3'-methyl-2'-benzo [b] thienyl) ethylamine.

The compounds of the present invention are normally administered in the form of pharmaceutical compositions comprising as an essential ingredient at least one active compound of formula I in association with at least one pharmaceutically accepted carrier therefor.

The compounds or compositions of the present invention can be administered by various routes and for this purpose can be formulated in a variety of forms. Thus the compounds or compositions can be administered by the oral and rectal routes, topically, by injection and by continuous or discontinuous intraarterial infusion in the form of, for example, tablets, sachets, cachets, elixirs, suspensions, aerosols, ointments, capsules, suppositories, injection solutions and suspensions in physiologically acceptable media, and sterile packaged powders for making injection solutions. Advantageously for this purpose, compositions can be provided in dosage unit form, preferably each dosage unit containing from 0.1 to 500 mg. (from 1.0 to 75 mg. in the case of parenteral administration, from 0.1 to 5.0 mg. in the case of inhalation and from 1.0 to 500 mg. in the case of oral or rectal administration) of a compound of formula I. Up to 2 or even 3 grams per day of active ingredient can be administered.

It will, of course, readily be understood that the amount of the compound or compounds of formula I actually to be administered will be determined by a physician in the light of all the relevant circumstances including the condition to be treated, the choice of compound to be administered and the choice of route of administration and therefore the above preferred dosage range is not intended to limit the scope of the present invention in any way.

In this Specification, the expression "dosage unit form" is used as meaning a physically discrete unit containing an individual quantity of the active ingredient; generally in admixture with a pharmaceutical diluent therefor or otherwise in association with a pharmaceutical carrier, the quantity of the active ingredient being such that one or more units are normally required for a single therapeutic administration or that, in the case of severable units such as scored tablets, at least one fraction such as a half or a quarter of a severable unit is required for a single therapeutic administration.

The formulations of the present invention normally comprise at least one compound of formula I mixed with a carrier, or diluted by a carrier, or enclosed or encapsulated by an ingestible carrier in the form of a capsule, sachet, cachet, paper or other container or by a disposable container such as an ampoule. A carrier or diluent may be a solid, semi-solid or liquid material, which serves as a vehicle, excipient or medium for the active therapeutic substance.

Some examples of the diluents or carriers which may be employed in the pharmaceutical compositions of the present invention are lactose, dextrose, sucrose, sorbitol, mannitol, propylene glycol, liquid paraffin, white soft paraffin, kaolin, microcrystalline cellulose, calcium silicate, silica, polyvinylpyrrolidone, cetostearyl alcohol, starch, gum acacia, calcium phosphate, cocoa butter, oil of theobroma, arachis oil, alginates, tragacanth, gelatin, syrup B.P., methy cellulose, polyoxyethylene sorbitan monolaurate, ethyl lactate, methyland propylhydroxybenzoate, sorbitan trioleate, sorbitan sesquioleate and oleyl alcohol and propellants such as trichloromonofluoromethane, dichlorodifluoromethane and dichlorotetrafluoromethane. In the case of tablets, a lubricant may be incorporated to prevent sticking and binding of the powdered ingredients in the dies and on the punch of the tabletting machine. For such purpose there may be employed for instance aluminum, magnesium or calcium stearates, talc or mineral oil.

The compounds of formula I are novel compounds and accordingly form a part of this invention. They can be prepared by reacting a compound of the formula:

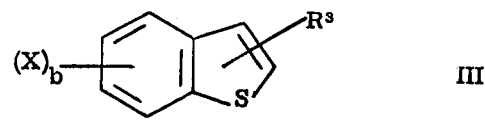

III wherein $R^3$ is a group of the formula —CH$_2$—G wherein G represents CN or CO—NR$^1$R$^2$, with a reducing agent such as, for example, lithium aluminium hydride and aluminium chloride in a solvent such as, for example, ether.

The compounds of formula III in which G represents CN can be prepared by reacting a compound of the formula:

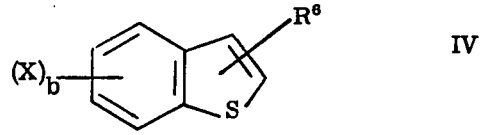

IV wherein $R^6$ is the group —CH$_2$—Hal. wherein Hal. represents halogen, with sodium cyanide in a solvent such as, for example, dimethyl sulphoxide, dimethyl formamide or aqueous ethanol.

The compounds of formula IV in which $R^6$ is in the 3-position can be prepared by reacting a compound of the formula:

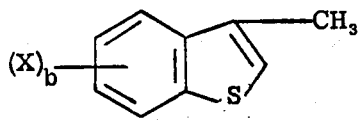

V with a halogenating agent such as, for example, chlorine, sulphuryl chloride, bromine or N-bromosuccinimide in the presence of a solvent such as, for example, carbon disulphide or carbon tetrachloride.

The compounds of formula V can in turn be prepared by cyclising an arylmercaptopropanone of the formula:

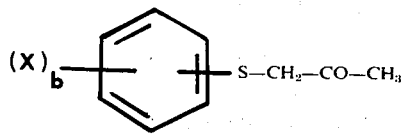

VI using a reagent such as, for example, phosphorus pentoxide.

The compounds of formula VI can themselves be prepared by the reaction of an alkali metal salt, preferably the sodium salt, of the appropriate thiophenol with a halogeno-acetone compound, preferably chloroacetone. Certain of the required substituted or unsubstituted thiophenols are available commercially but where this is not so, they may be obtained by conventional procedures.

The compounds of formula IV in which $R^6$ is in the 3-position may alternately be prepared by reacting the appropriate benzo-thiophen nucleus with a chloromethylating agent such as, for example, formaldehyde and hydrogen chloride. The appropraite benzothiophen nucleus may in turn be obtained by cyclising a compound of the formula:

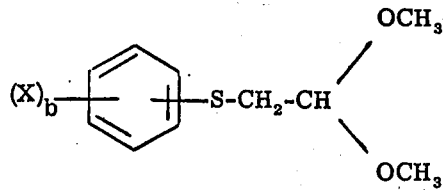

VII using a reagent such as, for example, polyphosphoric acid.

The compounds of formula IV in which $R^6$ is in the 2-position can be prepared by reacting a compound of the formula:

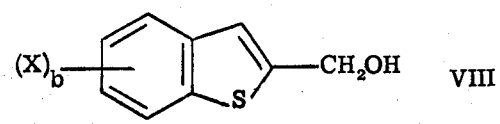

VIII with a halogenating agent such as, for example, thionyl chloride in a solvent such as chloroform.

The compounds of formula VIII can in turn be prepared by reacting a compound of the formula:

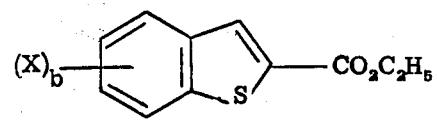

IX with a reducing agent such as, for example, lithium aluminium hydride in a solvent such as, for example, ether.

The compounds of formula IX may be prepared from the corresponding nitro compound by conventional methods. Thus, for example, an amino substituent may be obtained by reduction of the corresponding nitro group using, for example, hydrazine hydrate and Raney nickel. Amino groups so formed may in turn be converted to halogen groups by conventional methods.

The compounds of formula IV in which G represents —CO—$NR^1R^2$ wherein $R^1$ and $R^2$ are as defined in formula I, may be prepared by reacting the corresponding acid chloride with an amino compound of the formula H—$NR^1R^2$ in the presence of a solvent such as, for example, benzene or ether. The acid chloride may be obtained from the corresponding acid by reaction with thionyl chloride in a solvent such as, for example, chloroform, the acid itself being obtained by hydrolysis of the corresponding compound of formula III in which G represents CN.

The following Examples further illustrate the invention:

EXAMPLE 1

To a slurry of lithium aluminium hydride (0.025 mole) in dry ether (25 ml.) was added a solution of aluminium chloride (0.025 mole) in dry ether (50 ml.) under nitrogen with stirring. After 5 minutes, 5-chloro-3-cyanomethylbenzo [b] thiophen (0.025 mole) dispersed in dry ether (150 ml.) was slowly added and the mixture refluxed for 22 hours. Any excess of reducing agent was then destroyed by addition of water, and the mixture was basified by addition, with stirring, of aqueous sodium hydroxide. The ethereal layer was separated and the aqueous layer shaken with more ether. The combined ethereal layers were washed thoroughly with water, dried with magnesium sulphate and the required 2-(5'-chloro-3'-benzo [b] thienyl) ethylamine hydrochloride precipitated by addition of a solution of hydrogen chloride in ether. Recrystallisation from dry ethanol yielded the pure compound, m.p. 245°–246°C.

Anti-5HT activity

This activity was measured in vivo using essentially the method of Woolley, D.W., *Proc. Soc. Exp. Biol. Med.*, 98, 367 (1958). This method measures the reduction of 5-hydroxytryptophan induced diarrhoea in groups of 10 mice caused by the previous intraperitoneal injection of the compound being investigated. The compound of Example 1 at a dose 32 mg./kg. gave 80% protection against such induced diarrhoea. The $LD_{50}$ in mice was found to be 150 mg./kg.

The following compounds of Examples 2 to 4 were made by the method of Example 1 and were found to have similar activity to that of the compound of Example 1 but to have slightly improved $LD_{50}$'s.

EXAMPLE 2

2-(3'-Benzo[b] thienyl)ethylamine; m.p. 218°–219°C; $LD_{50}$ 200 mg./kg.

EXAMPLE 3

2-(5'-Methyl-3'-benzo [b] thienyl) ethylamine; m.p. 236°–237°C; $LD_{50}$ 200mg./kg.

EXAMPLE 4

2-(5'-Bromo-3'-benzo [b] thienyl) ethylamine; m.p. 249°–250°C.; $LD_{50}$ 500 mg./kg.

EXAMPLE 5

To a slurry of lithium aluminum hydride (0.0504 mole) in dry ether (50 ml.) was added a solution of aluminum chloride (0.0504 mole) in dry ether (50 ml.) in a nitrogen atmosphere with stirring. This was stirred for a further 5 minutes and then a dispersion of N-methyl-5-bromo-3-benzo [b] thienyl acetamide (0.0252 mole) in dry ether (100 ml.) was added slowly. The mixture was refluxed for 22 hours. The required N-methyl-2-(5'-bromo-3'-benzo [b] thienyl) ethylamine hydrochloride, m.p. 207°–208°C. was obtained by the procedure described in Example 1 and was crystallised from ethanol. The compound had similar anti-5HT activity to that of the compound of Example 1 and had an $LD_{50}$ of 300 mg./kg.

In the following Examples 6 to 17 details are given of further compounds made by the methods of Example 1 or Example 5, the latter method being used for N-substituted amino compounds. These compounds have similar activity to that of the compound of Example 1.

EXAMPLE 6

N-Methyl-2-(5'-chloro-3'-benzo [b] thienyl)ethylamine hydrochloride, m.p. 203°–205°C.

EXAMPLE 7

N-Methyl-2-(5'-methyl-3'-benzo [b] thienyl) ethylamine hydrochloride, m.p. 168°–170°C.

EXAMPLE 8

N,N-Dimethyl-2-(5'-chloro-3'-benzo [b] thienyl) ethylamine hydrochloride, m.p. 219°–220°C.

EXAMPLE 9

N,N-Dimethyl-2-(5'-bromo-3'-benzo [b] thienyl) ethylamine hydrochloride, m.p. 221°–222°C.

EXAMPLE 10

N,N-Dimethyl-2-(5'-methyl-3'-benzo [b] thienyl) ethylamine hydrochloride, m.p. 193°–194° C.

EXAMPLE 11

N,N-Dimethyl-2-(3'-benzo [b] thienyl) ethylamine hydrochloride, m.p. 184°–185°C.

EXAMPLE 12

2-(2'-Aminoethyl)-5-chlorobenzo [b] thiophen hydrochloride, m.p. 265°–267°C.

EXAMPLE 13

2-(2'-Aminoethyl)-5-bromobenzo [b] thiophen hydrochloride, m.p. 267°–269°C.

EXAMPLE 14

N-Methyl-2-(3'-benzol [b] thienyl) ethylamine hydrochloride, m.p. 163°–164°C.

EXAMPLE 15

3-(2'-Aminomethyl)-7-chlorobenzo [b] thiophen hydrochloride, m.p. 129° (dec).

EXAMPLE 16

3-(2'-Aminoethyl)-5-iodobenzo [b] thiophen hydrochloride, m.p. 264°–266°C.

EXAMPLE 17

N,N-Dimethyl-2-(7'-chloro-3'-benzo [b] thienyl) ethylamine hydrochloride, m.p. 202°–203°C.

PREPARATION OF STARTING MATERIALS FOR THE FOREGOING EXAMPLES.

Example A

Arylmercaptopropanones

Chloroacetone (116.3 g., 1.25 mole) was added to a stirred solution of the appropriate thiophenol (1.25 mole) in aqueous sodium hydroxide (50 g., 1.25 mole in 1.5 litres of water) at room temperature. The mixture was stirred for forty five minutes at room temperature and the product was extracted with ether. The ethereal extracts were washed with water, dried over sodium sulphate and then distilled under reduced pressure to yield the required arylmercaptopropanone, details of which are given in Table I below.

Table 1

| Arylmercaptopropanones -p-$X.C_6H_4.S.CH_2.CO.Me$ | | | |
|---|---|---|---|
| X | Yield % | B.p°C | M.p°C |
| H | 97 | 135–137/12 mm. Hg. | 32–34" |
| Me | 90 | 146–148/12 mm. Hg. | oil |
| Br | 90 | 176–178/12 mm. Hg. | 63–65" |
| Cl | 91 | 160–164/12 mm. Hg. | oil |

"Crystallised from light petroleum (b.p. 60–80°C)

Example B 5- or 6- Substituted benzo [b] thiophens

The appropriate 3- or 4- substituted phenyl 2,2-dimethoxyethyl sulphide (0.15 mole) was added slowly, in a thin stream through a capillary tube under the surface, to polyphosphoric acid (250 g.) heated to 170°–180°C. under a pressure of 5 mm.Hg. The addition was complete in 1 hour. The 5- or 6- substituted benzo [b] thiophen formed was distilled off immediately and collected in a receiver. Details of the compounds prepared are given in Table 2 below.

Table 2

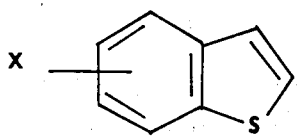

| X | Yield | b.p.°C | m.p.°C. |
|---|---|---|---|
| 5-$CH_3$ | 50% | — | 35–36 |
| 5-$C_2H_5$ | 70% | 78–80/0.4 mm. Hg. | — |
| 5-$CH(CH_3)_2$ | 76% | 88–90/0.5 mm.Hg. | — |
| 5-$C(CH_3)_3$ | 60% | 90–94/0.5 mm.Hg. | — |
| 6-$CH_3$ | 77% | 92/4 mm. Hg. | — |

Example C a. 5-Substituted 3-methylbenzo [b] thiophens

The appropriate arylmercaptopropanone (0.33 mole) was added to phosphorus pentoxide (71 g. 0.50 mole) and the mixture was heated slowly to 160°–180°C with vigorous stirring. A further quantity of the arylmercaptopropanone (0.66 mole) was then added followed by more phosphorus pentoxide (25 g., 0.176 mole). The reaction mixture was kept at 160°–180°C for 45 minutes and after being cooled, most of the product was extracted with ether. The residue in the flask was decomposed with hot water and filtered. The solid remaining in the Buchner funnel was washed thoroughly with ether, and the aqueous filtrate was shaken with ether. The combined ethereal extracts were dried over sodium sulphate and after removal of the ether, the required 5-substituted 3-methylbenzo [b] thiophen was obtained by distillation under reduced pressure. Details of compounds made are given in Table 3 below:

b. 5- or 7- Substituted 3-methylbenzo [b] thiophens

The appropriate arylmercaptopropanone (0.15 mole) and polyphosphoric acid (250 g.) were placed in a flask fitted with a stirrer and guarded against moisture. The mixture was heated slowly to 120°C., and then the temperature was maintained between 120°C and 140°C, for 4 hours, the mixture being stirred throughout. After being cooled, the brown mass was poured into water and then shaken with ether. The combined ether extracts were dried over sodium sulphate and the required 4- or 7- substituted 3-methylbenzo [b] thiophen was obtained by distillation under reduced pressure. Details of the compounds made are given in Table 3 below.

Table 3

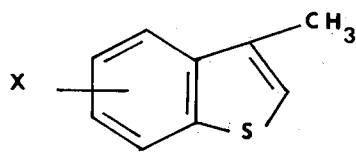

| Method | X | Yield % | B.p.°C |
|---|---|---|---|
| a | H | 70 | 106–110/12 mm.Hg. |
| b | H | 70 | 106–110/12 mm.Hg. |
| a | 5-$CH_3$ | 69 | 123–125/12 mm.Hg. |
| b | 5-$CH_3$ | 70 | 123–125/12 mm.Hg. |
| a | 5-Cl | 55 | 142–144/14 mm.Hg. |
| b | 5-Cl | 70 | 142–144/14 mm.Hg. |
| a | 5-Br | 47 | 153–158/12 mm.Hg. |

Table 3-Continued

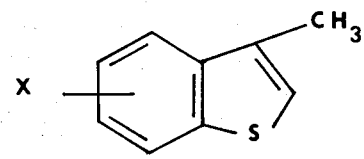

| Method | X | Yield % | B.p.°C |
|---|---|---|---|
| b | 5-Br | 70 | 153–158/12 mm.Hg. |
| b | 7-Cl | 80 | 110/2 mm.Hg. |
| b | 7-Br | 80 | 110–115/2 mm.Hg. |

Example D a. 5-Substituted 3-bromomethylbenzo [b] thiophens

Benzoyl peroxide (5.0g.) was added to a vigorously stirred solution of the appropriate 5-substituted -3-methylbenzo [b] thiophen (0.50 mole) in dry carbon tetrachloride (1.2 litres). N-bromosuccinimide (89g. 0.50 mole) was added in small portions at a time to the boiling mixture which was irradiated with two electric light bulbs (200 watts). The mixture was boiled for a further ninety minutes and was then cooled and filtered to remove the succinimide. Concentration of the filtrate to about 100 ml. resulted in the separation of most of the required 5-substituted 3-bromo-methylbenzo [b] thiophen. The rest was obtained by removing all the solvent and triturating the residue with light petroleum (b.p. 60°–80°C.). All the materials obtained by this method were sufficiently pure for use in subsequent stages but samples for analysis were crystallised from light petroleum (b.p. 60°–80°C.). Details of compounds made are given in Table 4 below.

b. 5- or 6- Substituted 3-chloromethylbenzo [b] thiophens

A rapid stream of hydrogen chloride was passed through a vigorously stirred mixture of aqueous formaldehyde (37 to 40%; 48.5 g.), concentrated hydrochloric acid (48.5 ml.) and the appropriate 5- or 6-substituted benzo [b] thiophen (65.2g.) until the mixture became saturated (about 30–40 minutes were required). During this time the temperature of the mixture went up to 65°C. This temperature was maintained for about one hour while a slow stream of hydrogen chloride was passed through the mixture. After being cooled, the mixture was diluted with cold water and shaken with benzene. The benzene layer was washed with water, sodium bicarbonate solution, with water again and then dried over sodium sulphate. After removal of the benzene, the 5- or 6-substituted 3-chloromethylbenzo [b] thiophen was obtained by distillation under reduced pressure. Details of compounds made are given in Table 4 below.

Table 4

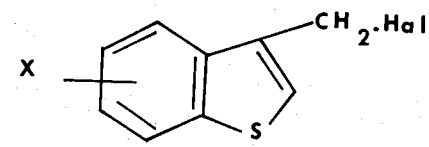

| Method | Hal. | X | Yield % | M.p.°C |
|---|---|---|---|---|
| a | Br | H | 82 | 64–66 |
| b | Cl | H | 75 | — |

Table 4-Continued

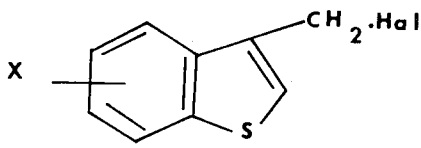

| Method | Hal. | X | Yield % | M.p.°C |
|---|---|---|---|---|
| a | Br | 5-CH₃ | 92 | 99.5–101.5 |
| b | Cl | 5-CH₃ | 63 | — |
| a | Br | 5-Br | 80 | 127–218.5 |
| a | Br | 5-Cl | 91 | 128–130 |
| b | Cl | 5-C₂H₅ | 74 | — |
| b | Cl | 5-CH(CH₃)₂ | 65 | — |
| b | Cl | 5-C(CH₃)₃ | 60 | 49–51 |
| b | Cl | 6-CH₃ | 63 | b.p.122–128/1 mm.Hg. |

Example E

5-Nitro-2-ethoxycarbonylbenzo [b] thiophen

Ethanolic sodium ethoxide was prepared from sodium (17.25g.) and ethanol (200 ml.) and was cooled to 0°C. Ethyl thioglycollate (90g., 0.75 mole) was added followed by 2-chloro-5-nitrobenzaldehyde (139-g., 0.75 mole) with stirring. After an hour at room temperature, the mixture was heated at its boiling point for 4 hours, then cooled and the resultant product filtered off. It was washed with water, then with ethanol and recrystallised from glacial acid. Details are given in Table 5 below.

Example F

5-Amino-2-ethoxycarbonylbenzo [b] thiophen

To a solution of 5-nitro-2-ethoxycarbonylbenzo [b] thiophen (20g.) in ethanol (200 ml.) was added hydrazine hydrate (20 ml. of 85%) followed by Raney nickel (2g.). After the reaction had subsided, the mixture was heated at 60°C. for one hour. Charcoal was added and the solution was boiled and filtered. Removal of the solvent yielded an oil, which was recrystallised from ethanol. Details are given in Table 5 below.

Example G a. 5-Chloro- or 5-bromo-2-ethoxycarbonylbenzo [b] thiophen

Sodium nitrite (6.6 g., 0.09 mole) was added in small portions to sulphuric acid (50 ml.) with rapid stirring. The mixture was warmed to dissolve the sodium nitrite completely. A solution of 5-amino-2-ethoxycarbonylbenzo [b] thiophen was prepared by dissolving the amine (15g., 0.07 mole) in glacial acetic acid (210 ml.), heating this solution to 90°C. and cooling rapidly. Diazotisation was carried out at 0°–10°C. by adding the amine solution to the sodium nitrite solution with stirring. The diazonium salt solution was run into a solution of the appropriate cuprous halide (12g.) in the appropriate hydrohalic acid (120 ml.). On dilution with water, the product separated, was filtered off and crystallised from ethanol. Details of the compounds are given in Table 5 below.

b. 5-Fluoro-2-ethoxycarbonylbenzo [b] thiophen

A solution of sodium nitrite (17.0 g., 0.25 mole) in water (30 ml.) was added to a vigorously stirred suspension of 5-amino-2-ethoxycarbonylbenzo [b] thiophen hydrochloride (40 g., 0.16 mole) in concentrated hydrochloride acid (50 ml.) while the temperature was kept below 5°C. The resultant solution was rapidly stirred, sodium tetrafluoroborate (100 g.) in water (120 ml.) was added and the resultant diazonium tetrafluoroborate was filtered off, washed with a little cold water, followed by methanol, then ether, and finally dried in vacuo. The dry material was heated in a one litre flask, and at 140°–150°C. the decomposition commenced and was complete within 15 minutes. The product was extracted with ether and evaporation of the solvent gave a yellow residue which crystallised from ethanol as colourless needles. Details of the compound are given in Table 5 below.

c. 5-Iodo-2-ethoxycarbonylbenzo [b] thiophen

5-Amino-2-ethoxycarbonylbenzo [b] thiophen (50 g.) was diazotised as described above. The clear solution was added to a stirred solution of potassium iodide (100 g.) in water (100 ml.) and the mixture heated on a steam bath for 20 minutes. The product was extracted with ether and the ethereal solution was washed first with aqueous sodium thiosulphate, then with dilute sodium hydroxide solution and finally with water and dried using sodium sulphate. Removal of the solvent gave a yellow residue which was crystallised from ethanol as colourless needles. Details of the product are given in Table 5 below.

Table 5

| X | Yield % | m.p.°C |
|---|---|---|
| Cl | 85 | 71–75 |
| Br | 80 | 84–85 |
| F | 69 | 70–72 |
| I | 84 | 72–73 |

Example H

5-Substituted 2-hydroxymethylbenzo [b] thiophens

Lithium aluminium hydride (10g., 0.28 mole) was dissolved in dry ether (200 ml.) and a solution of the 5-substituted 2-ethoxycarbonylbenzo [b] thiophen (0.15 mole) in dry ether (500 ml.) was added dropwise with rapid stirring. After the addition was complete, water (30 ml.) was added slowly followed by dilute sulphuric acid (30 ml. of concentrated sulphuric acid in 300 ml. water). The ethereal layer was separted, the aqueous layer shaken with ether, and the ethereal solutions bulked and dried over magnesium sulphate. Removal of the ether gave a solid which was crystallised from ethanol. Details are given in Table 6 below.

Table 6

| X | Yield % | m.p.°C |
|---|---|---|
| F | 90 | 124–125 |
| Cl | 76 | 108–109 |
| I | 90 | 129–130 |
| Br | 85 | 114–115 |

Example I

5-Substituted 2-chloromethylbenzo [b] thiophen

To a solution of the appropriate 5-substituted 2-hydroxymethylbenzo [b] thiophen (30 g.) in chloroform (100 ml.) was added thionyl chloride (20g., 0.17 mole) and the mixture was heated at its boiling point for ninety minutes. The solvent was removed under reduced pressure and the product remaining was dissolved in ether, washed with aqueous sodium bicarbonate and dried. The resulting 5-substituted 2-chloromethylbenzo [b] thiophen was used directly for preparing the corresponding 2-cyano methyl compounds.

Example J

5-Substituted-3-cyanomethylbenzo [b] thiophens

A solution of 5-substituted -3-bromomethylbenzo [b] thiophen (0.0478 mole) in the minimum of hot, dry dimethyl sulphoxide, was added dropwise with stirring to a partial solution of sodium cyanide (2.35 g., 0.048 mole) in dry dimethyl sulphoxide (10 ml.) at 60°–70°C. stirring was continued for a further 2 hours at 100°C. and then the cooled reaction mixture was poured into water. After cooling in a refrigerator, the 5-substituted-3-cyanomethylbenzo [b] thiophen was filtered, washed with water, dilute hydrochloric acid and finally water. The solid was dried in vacuo, and crystallised from propan-2-ol containing some charcoal. (The 5-hydrogen- and 5-methylsubstituted compounds were prepared from the corresponding 3-chloromethylbenzo [b] thiopens). Details of the compounds are given in Table 7 below.

Table 7

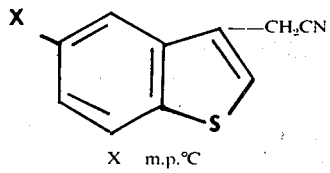

| X | m.p.°C |
|---|---|
| H | 65–6 |
| Me | 132–4 |
| Cl | 133–4 |
| Br | 139–40 |

Example K

5-Substituted -3-benzo [b] thienyl acetic acids

To a cooled mixture of water (42 ml.) concentrated sulphuric acid (42 ml.) and glacial acetic acid (42 ml.) was added 5-chloro-3-cyanomethylbenzo [b] thiophen (25.2 g., 0.1214 mole). The mixture was refluxed for 90 minutes, cooled and poured into ice water. The liberated 5-substituted-3-benzo [b] thienyl acetic acid was filtered, washed with water, dissolved in aqueous sodium hydroxide, treated with charcoal and filtered. Addition of concentrated hydrochloric acid to the cooled solution, precipitated the acid which was crystallised from ethanol/water and then from benzene. Details of the compounds are given in Table 8 below.

Table 8

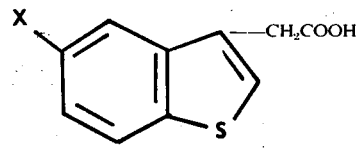

| X | m.p.°C |
|---|---|
| H | 106–7 |
| Me | 147–8 |
| Cl | 148–9 |
| Br | 152–3 |

Example L

N-Methyl-5-substituted-3-benzo [b] thienyl acetamides

A mixture of 5-substituted-3-benzo [b] thienylacetic acid (0.098 mole) and pure thionyl chloride (39 ml.) was refluxed for 2 hours. The excess of thionyl chloride was removed under reduced pressure and the crude acid chloride was dissolved in the minimum of dry acetone. The filtered solution was used directly in the next stage.

5-substituted-3-benzo [b] thienyl acetyl chloride in acetone was slowly added, with stirring, to a large excess of aqueous methylamine maintained at 0°C. It was stirred at this temperature for 1 hour, and then overnight at room temperature. The precipitated N-methyl-5-substituted-benzo [b] thienyl acetamide was filtered, washed with water and dried. Crystallisation from benzene/petrol (60°–80°C.) or ethyl acetate/petrol (60°–80°C.) produced the pure compound, details of which are given in Table 9 below.

Example M

N,N-Dimethyl-5-substituted-3-benzo [b] thienyl acetamides

5-Substituted-3-enzo [b] thienyl acetyl chloride in acetone was slowly added, with stirring, to a large excess of a solution of dimethylamine in benzene, at 0°C. It was stirred at this temperature for 1 hour and then overnight at room temperature. The precipitated dimethylamine hydrochloride was filtered and washed with benzene. The filtrate was washed with water and dried (MgSO$_4$). The solution was evaporated, and the oil obtained slowly solidified on cooling. Crystallisation from benzene/petrol (60°–80°C.) or ethyl acetate/petrol (60°–80°C.) containing some charcoal gave the pure N,N-dimethyl-5-substituted-3-benzo [b] thienyl acetamides, details of which are given in Table 9 below.

Table 9

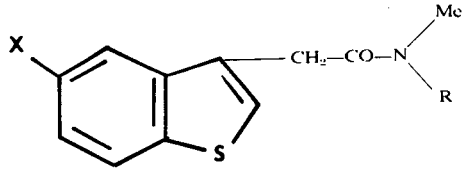

| X | R | m.p.°C. |
|---|---|---|
| H | H | 119.5–121.5 |
| H | Me | oil |
| Me | H | 115–116.5 |
| Me | Me | 82–84 |
| Cl | H | 150–151 |
| Cl | Me | 88–90 |
| Br | H | 168–170 |
| Br | Me | 107–108 |

The following Examples illustrate pharmaceutical formulations for use in accordance with the present invention:

Example 18

Tablets containing 20 mg. of the compound of Example 1 are made as follows:

| | |
|---|---|
| Compound of Example 1 | 20.0 mg. |
| Lactose | 187.5 mg. |
| Maize starch (i) | 20.0 mg. |
| Maize starch as a 1 in 10 paste with water (ii) | 10.0 mg. |
| Maize starch (iii) | 10.0 mg. |
| Magnesium Stearate | 2.5 mg. |

The lactose and starch (i) are passed through a 44 mesh B.S.S. screen and mixed thoroughly. The starch paste (ii) is used to granulate the mixture and the granules are passed through a 12 mesh B.S.S. screen. The granules are then dried at 40°C. and passed through a 16 mesh B.S.S. screen. The starch (iii), compound of Example 1 and the magnesium stearate are passed through a 60 mesh B.S.S. screen, added to the granules and mixed thoroughly. The resultant granules are then compressed to a tablet weight of 250 mg.

Such tablets are useful for administration to humans suffering migraine and/or hypertension. A dosage of from 250 to 500 mg. per day of active ingredient may be administered without noticeable toxic effects.

Example 19

Tablets containing 100 mg. of the compound of Example 3 are made as in Example 18 except that 257.5 mg. of lactose were used and the final weight of tablet was 400 mg. Such tablets are useful for administration to humans suffering migraine and/or hypertension. Dosages as detailed in Example 18 may be administered without noticeable toxic effects.

Similarly tablets containing any other active compound of formula I may be administered in like manner for the treatment of like conditions.

Example 20

Sterile powders containing 50 mg. of the compound of Example 4 are made as follows:

A 0.5 % w/v solution of the compound of Example 4 is prepared in distilled water and filtered through a bacterial proof filter into a sterile container. 10 ml. quantities (i.e. 50 mg. of active ingredient) are distributed aseptically into sterile ampoules which are freeze dried and hermetically sealed under aseptic conditions.

This sterile powder may be dissolved in 10 ml. or more of sterile water for injection or dissolved in alcohol or sterile 40% w/v propylene glycol just prior to use.

The resultant solution may be administered intravenously or by intra-arterial infusion to humans suffering from extreme hypertension, and up to 500 mg. of active ingredient may be administered without noticeable toxic effects. Similarly any other compound of formula I may be used.

Example 21

An ointment containing 0.5% of the compound of Example 5 is prepared as follows:

| | |
|---|---|
| Compound of Example 5 | 0.5 g |
| Liquid paraffin | 5.0 g |
| White Soft Paraffin | 94.5 g |

The white soft paraffin and liquid paraffin are melted together using gentle heat and the active ingredient, previously passed through a 60 mesh B.S.S. screen, is suspended in the melted paraffins. The mixture is then stirred until cold to form an ointment which is useful for the treatment of skin allergies. Similarly, any other compound of formula I may be formulated and used in this manner.

Example 22

Suppositories containing 200 and 400 mg. of the compound of Example 1 are prepared as follows:

| | |
|---|---|
| Compound of Example 1 | 20 g |
| Oil of Theobroma | 80 g |

The active ingredient is passed through a 60 mesh B.S.S. screen and suspended in the theobroma oil previously melted using the minimum amount of heat necessary. The mixture is then poured into suppository moulds of a nominal capacity of 1 g. or 2 g. as desired, to produce suppositories each containing 200 mg. or 400 mg. of active ingredient. These suppositories are useful in the treatment of hypertension and up to 2 g. per day of active ingredient may be administered without toxic side effects being noticed. Similarly any other compound of formula I may be formulated and used in this manner.

Example 23

An aerosol was prepared containing the following ingredients:

| | Quantity per ml. |
|---|---|
| Compound of Example 1 | 2.0 mg. |
| Oleyl alcohol | 6.0 mg. |
| Trichloromonofluoromethane | 562.5 mg. |
| Dichlorodifluoromethane | 829.5 mg. |
| | 1400.0 mg. |

The compound of Example 1 was micronised and added to the required amount of oleyl alcohol and the two stirred for at least 30 minutes. The resultant suspension was passed through a colloid mill at a 5 micron opening. The required amount of this suspension was mixed with the propellants and cooled to minus 20°–30°F. The mixture was filled into stainless steel containers and the valve units fitted and sealed to the container. These valve units may be equipped with a metering device so that approximately 0.15 mg. of active ingredient is released by a single actuation of the valve. This formulation is particularly useful in the treatment of allergic asthma.

Having regard to the foregoing disclosure, the following is claimed as the inventive and patentable embodiments thereof:

1. A compound of the formula

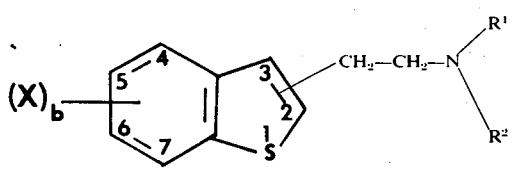

wherein $(X)_b$ represents one or more of the same or different substituents in the benzothienyl nucleus; $b$ is an integer from 1 to 4; X is halogen and alkyl containing from one to six carbon atoms; and $R^1$ and $R^2$ are selected from the group consisting of the same or different hydrogen; and acid addition salt thereof.

2. A compound of claim 1 in which $b$ is one.

3. A compound of claim 1 in which b is one; X is chlorine or bromine; and $R^1$ and $R^2$ are the same or different hydrogen, methyl or ethyl.

4. A compound of claim 1 in which b is one; X is chlorine or bromine in the 5-position; and $R^1$ and $R^2$ are both hydrogen.

5. A compound of claim 1 wherein b is one, X is chlorine, bromine or iodine, and $R^1$ and $R^2$ are selected from the group consisting of hydrogen and alkyl containing from one to six carbon atoms.

6. A non-toxic pharmaceutically-acceptable acid addition salt of a compound of claim 1.

7. A compound of claim 1 in which $b$ is one, and $R^1$ and $R^2$ are selected from the group consisting of hydrogen, methyl and ethyl.

8. A compound of claim 7 in which both $R^1$ and $R^2$ are hydrogen.

9. A compound of claim 8 in which X is at the 5-position.

10. A compound of claim 8 in which X is at the 7-position.

11. A compound of claim 8 in which the radical $-CH_2-CH_2-NH_2$ is located at the 2-position.

12. A compound of claim 8 in which the radical $-CH_2-CH_2-NH_2$ is located at the 3-position.

* * * * *

UNITED STATES PATENT OFFICE
CERTIFICATE OF CORRECTION

Patent No. 3,910,955   Dated October 7, 1975

Inventor(s) Norman Bellamy Chapman et al.

It is certified that error appears in the above-identified patent and that said Letters Patent are hereby corrected as shown below:

| | | |
|---|---|---|
| Column 1, line 2 | : | "Dec. 27" should be --Dec. 21-- |
| Column 1, line 58 | : | "cmpound" should be --compound-- |
| Column 2, line 28 | : | "methyl)," should be --methyl,-- |
| Column 2, line 41 | : | "o" should be --o-- |
| Column 2, line 52 | : | "slats" should be --salts-- |
| Column 4, line 28 | : | "methyland" should be --methyl and-- |
| Column 5, line 48 | : | "appropraite" should be --appropriate-- |
| Column 14, line 51 | : | "enzo" should be --benzo-- |

Signed and Sealed this

Fifth Day of October 1976

[SEAL]

Attest:

RUTH C. MASON
*Attesting Officer*

C. MARSHALL DANN
*Commissioner of Patents and Trademarks*